United States Patent
Hall et al.

(10) Patent No.: US 10,177,583 B2
(45) Date of Patent: Jan. 8, 2019

(54) UNIVERSITY SWITCH AND DOCK WITH FLIP-OUT DOCKING PRONG

(71) Applicants: David R. Hall, Provo, UT (US); Mark D. Hall, Springville, UT (US); Clint Cook, American Fork, UT (US); Davido Hyer, Spanish Fork, UT (US); Joe Fox, Spanish Fork, UT (US); Jedediah Knight, Provo, UT (US)

(72) Inventors: David R. Hall, Provo, UT (US); Mark D. Hall, Springville, UT (US); Clint Cook, American Fork, UT (US); Davido Hyer, Spanish Fork, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 406 days.

(21) Appl. No.: 15/183,012

(22) Filed: Jun. 15, 2016

(65) Prior Publication Data

US 2017/0366025 A1    Dec. 21, 2017

(51) Int. Cl.
*H02J 7/00* (2006.01)

(52) U.S. Cl.
CPC .......... *H02J 7/0044* (2013.01); *H02J 7/0047* (2013.01)

(58) Field of Classification Search
CPC ............................. H02J 7/0044; H02J 7/0047
See application file for complete search history.

(56) References Cited

U.S. PATENT DOCUMENTS

| 5,457,745 A * | 10/1995 | Wang .................. B60R 11/0241 379/426 |
| 5,539,821 A * | 7/1996 | Blonder ................ H02J 7/0044 379/446 |
| 8,672,228 B1 * | 3/2014 | Saini ...................... H01R 11/30 235/486 |
| 9,966,788 B2 * | 5/2018 | Hall ........................ H02J 7/025 |
| 2006/0145039 A1 * | 7/2006 | Shawver ............. B60R 11/0241 248/309.1 |
| 2015/0028797 A1 * | 1/2015 | Miller ................... H02J 7/0042 320/103 |
| 2017/0366033 A1 * | 12/2017 | Hall ........................ H02J 7/025 |

OTHER PUBLICATIONS

Best Europe Travel Adapters, May 23, 2016, www.ratingbest.com, 4 pages.*

* cited by examiner

*Primary Examiner* — Lewis West

(57) ABSTRACT

An apparatus is disclosed that includes a battery-powered wireless switch and a switch dock. The switch includes a microcontroller, a short range wireless transmitter, and one or more tactile control buttons. Additionally, the switch includes one or more docking prongs. Each docking prong is contained within a groove in a switch back, with pivot pins through one end of each docking prong perpendicular to a prong longitudinal axis and parallel to the switch back. The switch also includes flexible strips coupled to the same end of each docking prong as the pivot pins, and a prong extender button coupled to the flexible strips. The dock includes one or more docking prong slots, where the number of slots matches the number of prongs. The prongs fit in the slots to mount the switch to the dock.

20 Claims, 11 Drawing Sheets

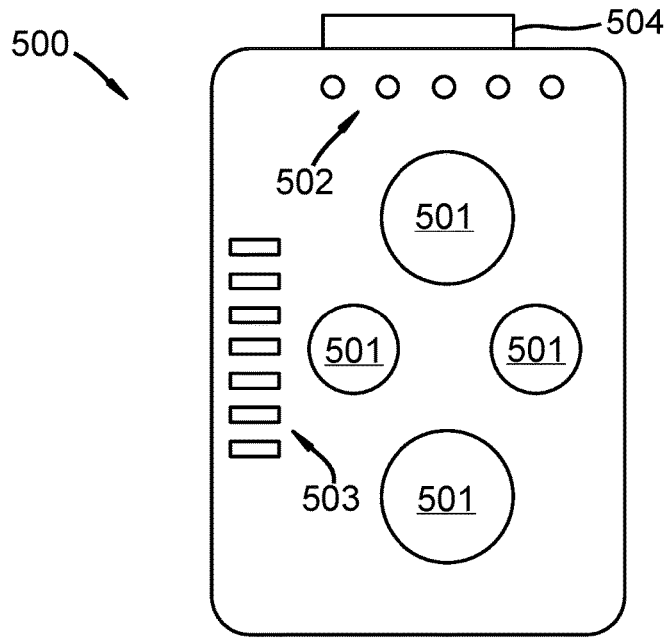
FIG. 5A
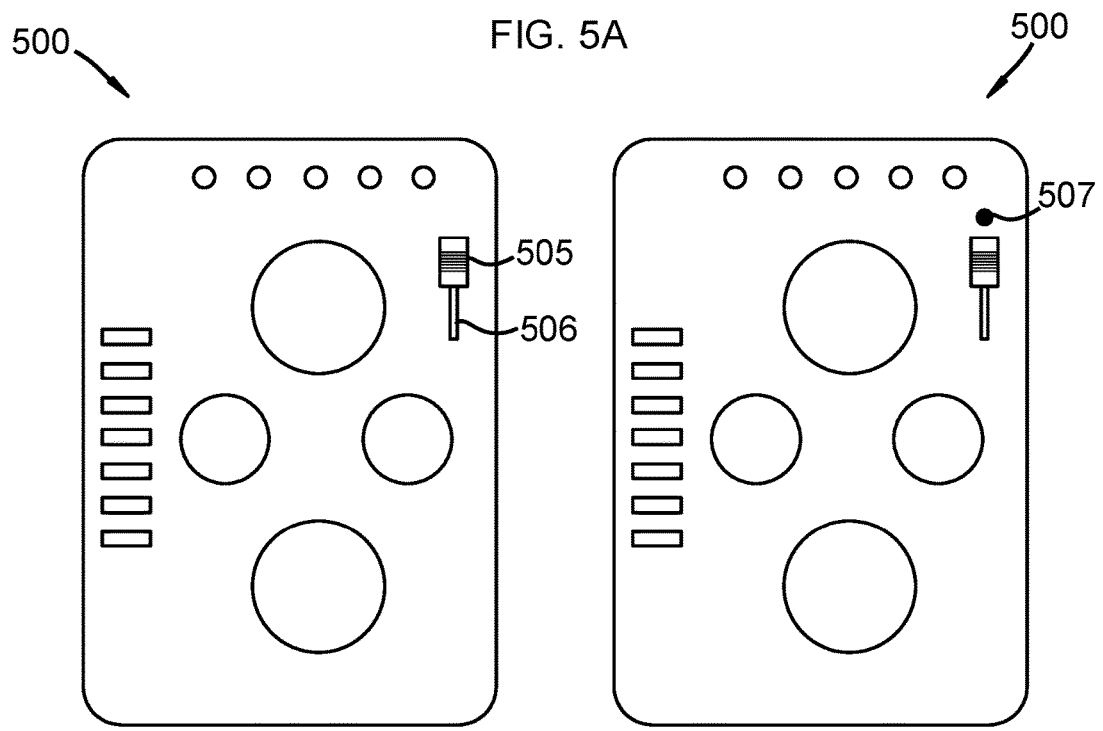
FIG. 5B
FIG. 5C

UNIVERSITY SWITCH AND DOCK WITH FLIP-OUT DOCKING PRONG

TECHNICAL FIELD

This invention relates generally to the field of home automation, and more specifically to remotes and switches for home automation.

BACKGROUND

The Internet of Things (the "IoT") is an exploding area of technology which some argue is the next frontier of interconnectivity. A primary benefit of the IoT is remote control of devices, for example, around a home, office, or other commercial environment. Many solutions have been presented for remote control, including smartphone/tablet and internet applications, and hardware remotes. Hardware remotes have the benefit of being dedicated, local, and mobile. Despite these benefits, IoT manufacturers and designers still face the challenge of user acceptance, which includes bridging functionality that users are accustomed to with new functionality that enhances the user experience. While some solutions have been presented for wireless control of IoT devices, little has been done to address the need for bridging functionality. An additional problem with remote control of IoT devices is, simply, that remotes get lost. Many remote control manufacturers have addressed this problem by providing docks for remotes. Remotes are mounted to such docks magnetically, or by flexible plastic biases. However, such means of mounting remotes are often not sturdy enough for wall-mounted remotes in high-traffic areas where the remotes are likely to be inadvertently struck and dislodged.

SUMMARY OF THE INVENTION

A battery-powered wireless switch and an accompanying switch dock are disclosed herein that overcome at least some of the challenges mentioned above. The dock, which is mounted to a wall similar to a single-gang switch plate, holds the switch securely to prevent the switch from being easily dislodged. Additionally, the wireless switch is easily and conveniently removed from the dock. When mounted, the wireless switch is held in place by one or more docking prongs, each of which fit into a slot, where the number of prongs matches the number of slots. The prongs are on either the switch or the dock, and the slots are in either the dock or switch, respectively. When the switch is not mounted in the dock, the docking prongs retract into grooves.

The claimed invention addresses several issues with the current state of remotes for IoT devices. First, the dock and switch are mounted to a wall like a common, single-gang switch plate. The size and positioning is familiar to users, thus improving the likelihood of user adoption, bridging functionality a user is accustomed to with modern functionality. Additionally, the switch is mounted using prongs, which are sturdier than magnets and plastic biases against dislodging in high-traffic areas where the switch is likely to be struck.

In one embodiment, an apparatus is disclosed that includes a battery-powered wireless switch and a switch dock. The switch includes a microcontroller, a short range wireless transmitter, and one or more tactile control buttons. Additionally, the switch includes one or more docking prongs. Each docking prong is contained within a groove in a switch back, with pivot pins through one end of each docking prong perpendicular to a prong longitudinal axis and parallel to the switch back. The switch also includes flexible strips coupled to the same end of each docking prong as the pivot pins, and a prong extender button coupled to the flexible strips. The dock includes one or more docking prong slots, where the number of slots matches the number of prongs. The prongs fit in the slots to mount the switch to the dock.

In another embodiment, an apparatus is disclosed that also includes a battery-powered wireless switch and a switch dock. The switch includes a microcontroller, a short range wireless transmitter, one or more tactile control buttons, and one or more angled slots in a back face of the switch. The dock includes one or more docking prongs. Each prong is contained within a groove in a dock face, with pivot pins through one end of each docking prong perpendicular to a prong longitudinal axis and parallel to the dock face. The dock also includes flexible strips coupled to the same end of each docking prong as the pivot pins, and a prong extender button coupled to the flexible strips. The number of slots in the back face of the switch matches the number of prongs, and the prongs fit in the slots to mount the switch to the dock.

BRIEF DESCRIPTION OF THE DRAWINGS

A more particular description of the invention briefly described above is made below by reference to specific embodiments. Several embodiments are depicted in drawings included with this application, in which:

FIGS. 5A-C depict embodiments of a wireless switch including user controls and indicators;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

Figure 1:
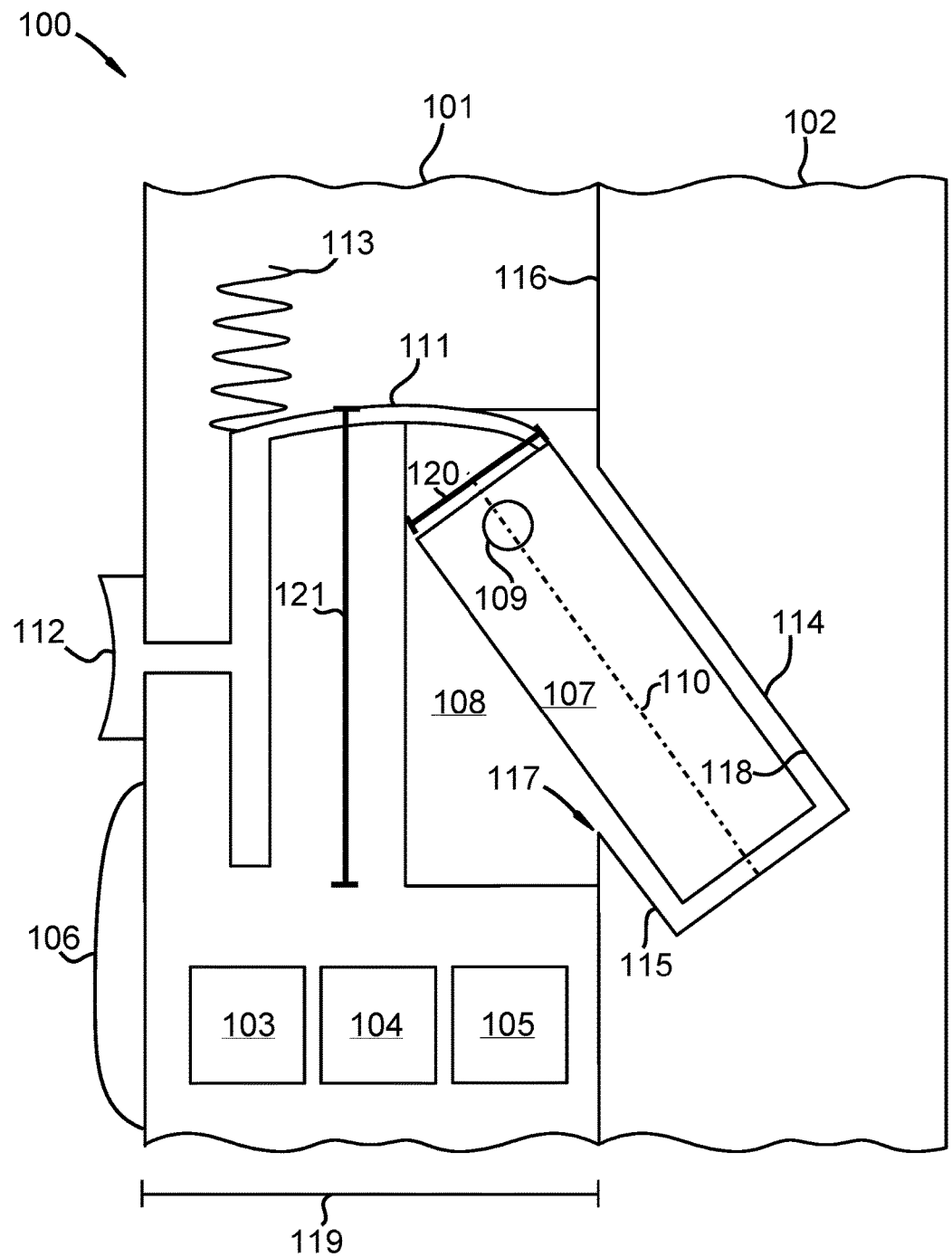
FIG. 1 depicts one embodiment of a battery-powered wireless switch and switch dock, in accordance with the claimed invention.

FIG. 1 depicts one embodiment of a battery-powered wireless switch and switch dock, in accordance with the claimed invention. Apparatus 100 includes battery-powered wireless switch 101 and switch dock 102. Switch 101 includes microcontroller 103, short range wireless transmitter 104, battery 105, tactile control button 106, and docking prong 107. Switch 101 also includes groove 108 in switch back 109. Groove 108 contains prong 107. Pivot pin 109 passes through a switch-side end of prong 107 perpendicular to prong longitudinal axis 110 and parallel to switch back 109. Switch 101 further includes flexible strip 111 coupled to the same end of prong 107 as pivot pin 109. Prong extender button 112 is coupled to flexible strip 111, and is biased by spring 113. Switch dock 102 includes docking prong slot 114. Prong 107 fits in slot 114 to mount switch 101 to dock 102. In some embodiments, switch 101 includes more than one prong 107. In any embodiment, the number of slots 114 matches the number of prongs 107.

Microcontroller 103 is any of a variety of off-the-shelf microcontrollers that include memory and processors for storing and executing instructions. Microcontroller 103 is networked to wireless transmitter 104, such as via a printed circuit board (PCB). Wireless transmitter 104 is, similarly, any of a variety of off-the-shelf transmitters. For example, in one embodiment, wireless transmitter 104 is a Bluetooth transceiver. In another embodiment, transmitter 104 is a LoRa transceiver (operating on channels in the 902-928 MHz ISM band). In yet another embodiment, transmitter 104 is an infrared transmitter. Microcontroller 103 and transceiver 104 are powered by battery 105. Battery 105 is any of a variety of off-the-shelf batteries, such as a 3V coin cell.

Microcontroller 103 stores operation instructions for switch 101 and any of a variety of wirelessly-controlled devices, such as wireless house lights, blinds, ceiling fans, or any of a variety of household appliances. Switch 101 controls such devices by transmitting control instructions to the devices via transmitter 104. In some embodiments, switch 101 receives and stores information from the devices.

Switch 101 is mounted to dock 102 and held in place by a number of forces. As depicted, when prong 107 is extended and spring 113 is in an equilibrium state, flexible strip 111 exerts a biasing force on prong 107, creating a torque on prong 107 aligned with pivot pin 109. When switch 101 is not mounted to dock 102, the torque on prong 107 by flexible strip 111 causes prong 107 to swing in towards groove 108. When switch 101 is mounted to dock 102, the torque on prong 107 by flexible strip 111 causes prong 107 to exert a force on wall 115 of slot 114, which pulls the body of switch 101 against dock face 116. In some embodiments (such as is depicted below in FIGS. 8A-B), dock 102 includes a lip upon which a bottom face of switch 101 rests, adding a supporting force for switch 101 to oppose gravity. However, in some embodiments, dock 102 does not include a lip. In such embodiments, other forces support switch 101. In one embodiment, the torque created by flexible strip 111 results in a sufficient opposing force on prong 107 by wall 115 to fully counteract the force of gravity on switch 101. In other embodiments, the torque created by flexible strip 111 is not sufficient to counteract gravity. In such embodiments, prong 107 pivots around point 117 and exerts a force against point 117 and slot face 118. The torque created by the force exerted by wall 118 on prong 107 about point 117 pulls switch 101 against dock face 116 and sufficiently counteracts the force of gravity on switch 101 to support switch 101.

Flexible strip 111 is composed of any of a variety of off-the-shelf flexible elastic materials that exert an elastic force when displaced from a state of equilibrium, such as when curved from a flat state. Those of skill in the art recognize that the elasticity of flexible strip 111 depends on the dimensions of strip 111 and the material or materials strip 111 is composed of. Thus, a virtually innumerable combination of dimensions and materials are available that are suitable for flexible strip 111. In general, flexible strip 111 fully counteracts the force of gravity when the young's modulus of flexible strip 111 is proportional to a function including the weight of switch 101, the ratio of the area of flexible strip perpendicular to a longitudinal axis of pivot pin 109 and parallel (when prong 107 is not extended) to longitudinal axis 110 divided by the area of flexible strip 111 perpendicular to the longitudinal axis of pivot pin 109 and perpendicular (when prong 107 is not extended) to longitudinal axis 110 (herein "Alw/Awd"), and curvature of flexible strip 101 when prong 107 is fully extended. The curvature of flexible strip 111 depends on the where flexible strip 111 is coupled to prong 107 and where pivot pin 109 is positioned in prong 107. Generally, the curvature of flexible strip 111 is a function of the angle of full extension, the length of prong 107, the depth of slot 114, and the distance from pivot pin 109 to the position on prong 107 where flexible strip 111 is coupled to prong 107.

Various embodiments of switch 101 include flexible strip 111 having a Young's modulus ranging from 0.1 to 0.0001. Specific examples include flexible strip 111 having a Young's modulus ranging from 0.001 to 0.002, 0.01 to 0.04, 0.0014 to 0.004, 0.0015 to 0.0025, 0.0007 to 0.002, 0.002 to 0.003, or 0.005 to 0.02. However, when flexible strip 111 has a higher Young's modulus, the Alw/Awd is proportionally higher, such that flexible strip 111 is much thinner relative to its length for high Young's modulus materials compared with lower Young's modulus materials. Such conditions apply when, for example, flexible strip 111 has a Young's modulus ranging from 0.1 to 200, 81 to 100, 68 to 82, 69 to 150, 112 to 148, 189 to 210, or 15 to 28.

Similarly, various embodiments of switch 101 include flexible strip 111 having a variety of lengths. The length of flexible strip 111 depends on depth 119 of switch 101, depth 120 of prong 107, amount of curvature in flexible strip 111 when 107 is not extended, the position on prong 107 where flexible strip 111 is coupled to prong 107, and the shape of prong 107. Depth 119 ranges from 100% of depth 120 to 1000% of depth 120. In embodiments where prong 107 is prismatic or cylindrical, the length of flexible strip 111 ranges from 120% of depth 119 to 100% of depth 120.

Prong 107 is composed of any material sufficient to bear the weight of switch 101. For example, in various embodiments, prong 107 is any type of hard molded plastic, such as various types of HDPE and/or polypropylene. In some embodiments, as will be described below in more detail with regard to FIG. 4, prong 107 includes a conductive material such as copper. In some other embodiments, prong 107 is composed of a metallic or metal composite. Groove 108 contains prong 107. Groove 108 is thus big enough to contain prong 107, and big enough to allow prong 107 to extend. Length 121 of groove 108 depends on the maximum extension degree of prong 107. For example, when the maximum extension degree of prong 107 is completely outside groove 108, length 121 is equal to or greater than a corresponding diagonal length of prong 107. This allows prong 107 a full range of extension from switch 101.

Spring 113 is any of a variety of off-the-shelf springs. Embodiments include coil tension springs. The spring constant of spring 113 is sufficiently high to counteract the elastic force exerted by flexible strip 111, but not so high that a user would have difficulty extending the spring via button 112. For example, in some embodiments of switch 101, a user slides button 112 using a thumb and/or finger. In such embodiments, spring's 113 spring constant is low enough that the user can slide button 112 with ease, while still being high enough to retract button 112 and counteract the elastic force of flexible strip 111.

In a specific embodiment of apparatus 100, dock 102 is mounted to a wall, positioned similar to a typical single-gang light switch. A user mounts switch 101 to dock 102 by sliding button 112 to extend prong 107. When the user slides button 112, flexible strip pulls on prong 107, creating a torque about pivot pin 109. When the user mounts switch 101 to dock 102, prong 107 fits in slot 114. When the user releases button 112, spring 113 retracts button 112. Prong 107 is held in place by slot 114. The force exerted on flexible strip 111 by spring 113 retracting button 112, and by prong 107 being fixed in place by slot 114, causes flexible strip 111 to bend, further securing switch 101 to dock 102 (as described above).

Figure 2:
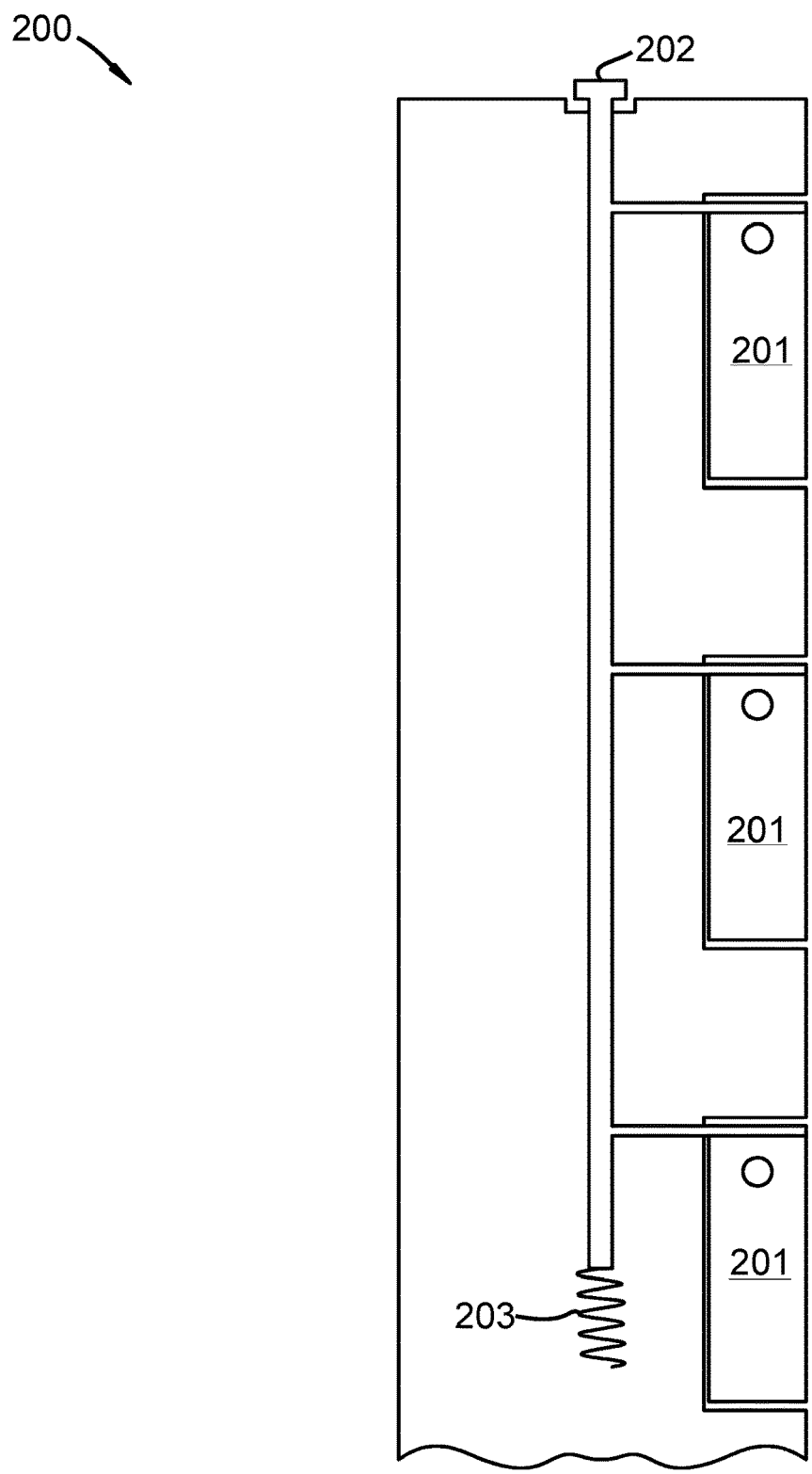
FIG. 2 depicts one embodiment of a wireless switch in accordance with the claimed invention.

FIG. 2 depicts one embodiment of a wireless switch in accordance with the claimed invention. Switch 200 is similar to switch 101 described above with regard to FIG. 1. However, switch 200 includes multiple prongs 201. Additionally, switch 200 includes extender button 202 at a top side of switch 200 and spring 203 positioned distally from extender button 202. Spring 203 is a compression coil spring, and biases button 202 towards the top side of switch 200. When a user presses button 202, spring 203 compresses and prongs 201 extend. When the user releases button 202, spring 203 pushes button towards the top side of switch 200.

Figure 3:
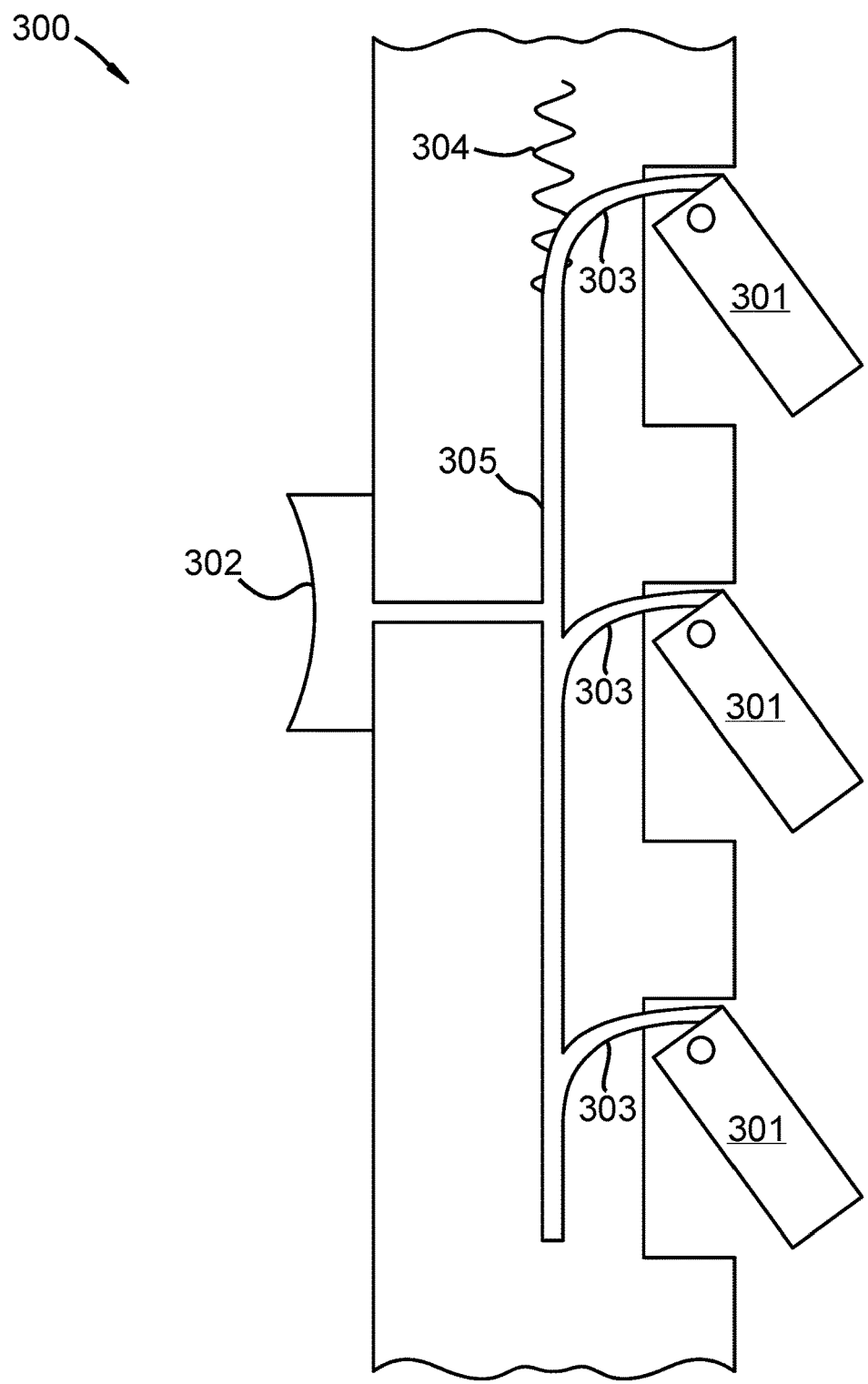
FIG. 3 depicts an embodiment of a wireless battery-powered switch with prongs extended by an extender button.

FIG. 3 depicts an embodiment of a wireless battery-powered switch with prongs extended by an extender button. Switch 300 includes prongs 301, extender button 302, flexible strips 303, spring 304, and coupler 305. As depicted, button 302 is positioned so that flexible strips 303 exert a force on prongs 301, extending prongs 301. Spring 304 is also extended, and exerts a retracting force on button 302 via coupler 305.

Figure 4:
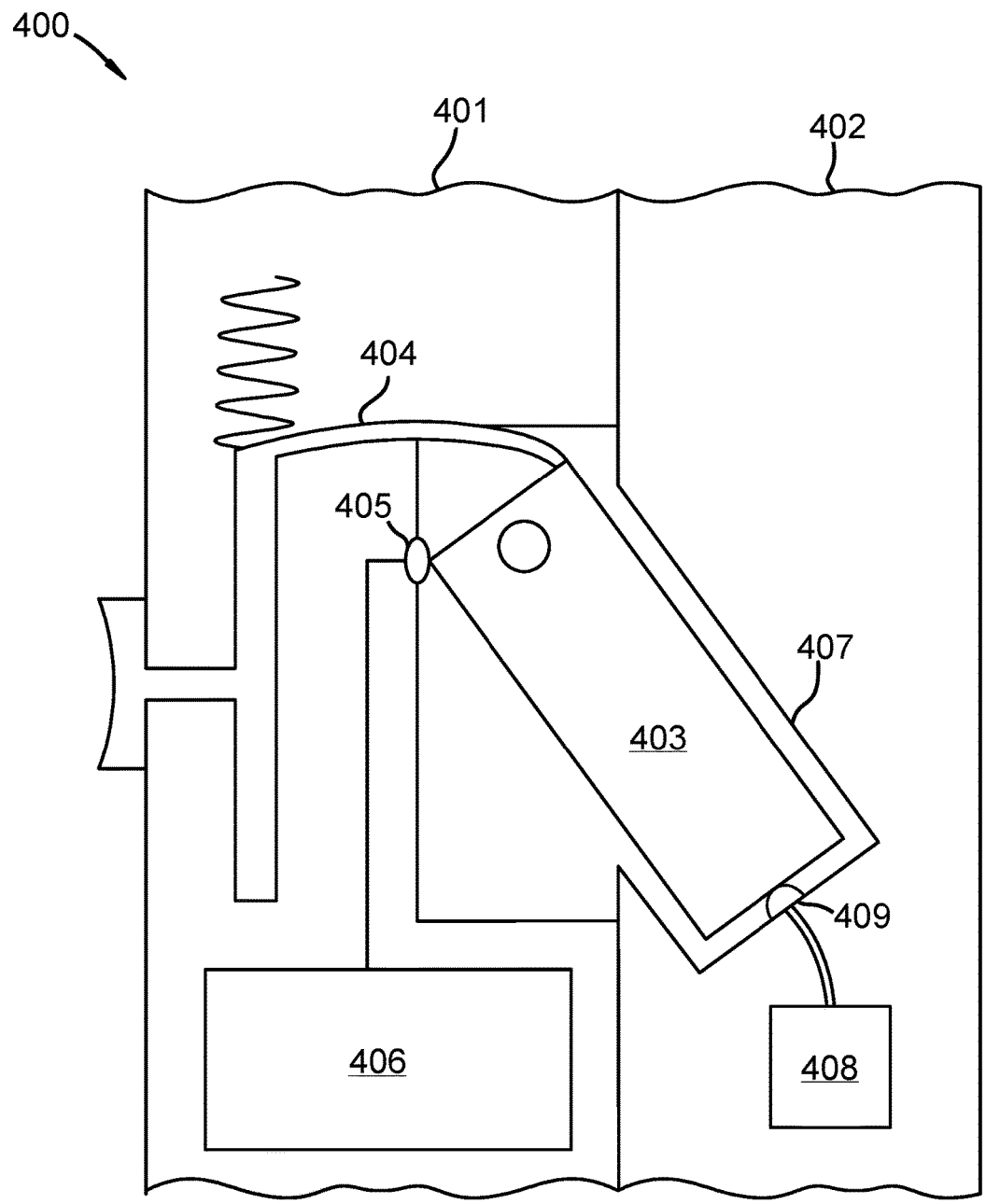
FIG. 4 depicts an embodiment of a wireless battery-powered switch with a mounting prong networked to switch electronics.

FIG. 4 depicts an embodiment of a wireless battery-powered switch with a mounting prong networked to switch electronics. Apparatus 400 includes switch 401 and dock 402. Switch 401 includes prong 403, flexible strip 404, metallic contact 405, and switch electronics 406. Switch dock 402 includes slot 407, dock electronics 408, and metallic contact 409. Electronics 406 include a switch microcontroller, a switch wireless transmitter, and a switch battery. Electronics 408 similarly include hardware memory, one or more hardware processors, and a dock transceiver. In some embodiments, electronics 408 also include a power source. The power source is, in some embodiments, a battery. In other embodiments, the power source is mains electricity. In such embodiments, dock 402 is coupled to the power source via, for example, a wired connection.

In some embodiments, prong 403 is coupled to electronics 406. For example, in one embodiment, prong 403 is coupled to the switch microcontroller. In such embodiments, slot 407 is coupled to one or more of the hardware memory and/or the hardware processors. Switch 401 communicates information with dock 402 via prong 403 in such embodiments.

In similar embodiments, prong 403 is coupled to the switch battery, and prong 403 transfers energy between switch 401 and dock 402 to charge the switch battery. For example, in one embodiment, dock 402 is coupled to mains electricity, and the switch battery is charged via slot 407 and prong 403. In such an embodiment, dock 402 and/or switch 401 includes an AC power converter.

In embodiments where prong 403 charges the switch battery and/or communicates information with electronics 406, prong 403 includes an electrical conductor. For example, in one embodiment, prong 403 is a metallic conductor. In another embodiment, prong 403 is plastic, and includes a conducting wire. Prong 403 conducts electricity by contacting metallic contacts 405, 409. Prong 403 is coupled to the switch battery by metallic contact 405, forming electrical contact with metallic contact 405 when prong 403 is extended (as depicted). Prong 403 additionally forms electrical contact with metallic contact 409, forming a circuit between electronics 406 and electronics 408. Alternatively, in some embodiments, flexible strip 404 includes a conducting wire. In such embodiments, flexible strip 404 is networked to electronics 406 and conducts electricity and electrical signals to electronics 406 from prong 403.

FIGS. 5A-C depict embodiments of a wireless switch including user controls and indicators. FIG. 5A includes a switch 500, tactile control buttons 501, device type LED indicator lights 502, device status LED indicator lights 503, and a rod extender button 504. Control buttons 501 allow the user to select one or more groups of devices and then send and receive signals between switch 500 and the selected device or devices (not shown). As depicted, LEDs 502 are aligned parallel to a top portion of switch 500, and LEDs 503 are aligned parallel to a side portion of switch 500. However, in other embodiments not depicted, LEDs 502, 503 are aligned in various positions on switch 500. For example, in one embodiment, each set of LEDs 502, 503 are aligned parallel to the top portion. In a similar embodiment, each set of LEDs 502, 503 are aligned parallel to a bottom portion. Those of skill in the art will recognize other similar alignments of LEDs 502, 503 on switch 500.

LEDs 502 indicate to a user one or more groups of devices selected for control by switch 500. As depicted, LEDs 502 indicate to a user up to five groups of devices selected for control. However, in some embodiments (though not depicted), switch 500 controls up to two groups of devices, and includes only two LEDs 502. In other embodiments, the number of LEDs 502, and the number of device groups switch 500 controls, ranges from 2 to 10. A single LED 502 lights corresponding to a group of devices selected for control. For example, in one embodiment, a user operates switch 500 to control an electric fan and/or an air conditioner unit. One LED 502 corresponds to the electric fan and illuminates when the user selects the electric fan for control by switch 500. Another LED 502 corresponds to the air conditioner unit and illuminates when the user selects the air conditioner unit for control by switch 500.

LEDs 503 indicate to a user a selected-device operation level. As depicted, LEDs 503 indicate to a user up to 7 status levels of devices selected for control. In other embodiments, the number of LEDs 503, and number of statuses displayed, ranges from 2 to 20. LEDs 503 light corresponding to a status of a device selected for control. For example, in one embodiment, a user operates a wireless switch 500 to control an electric light. An LED 502 corresponds to the electric light and will illuminate when the electric light is selected for control. Using buttons 501, the user switches the light on. A corresponding LED 503 illuminates indicating the selected light is on. Using buttons 501, the user switches the light off. Another corresponding LED 503 illuminates indicating the selected light is off. In another embodiment, a user operates wireless switch 500 to control an electric fan. An LED 502 corresponds to the fan and will illuminate when the fan is selected for control. Using buttons 501, the user switches the fan to a low setting. A corresponding LED 503 illuminates indicating the selected fan is set at low. Using buttons 501, the user switches the fan to a high setting. Another corresponding LED 503 illuminates indicating the selected fan is set at high. Alternatively, in some embodiments, a number of LEDs 503 light up corresponding to a speed of the fan. For example, at low speed, one LED 503 lights. At medium speed, 4 LEDs 503 light. At high speed, all LEDs 503 light.

Button 504 is similar to the extender buttons described above (such as button 202 described above with regard to FIG. 2). A user presses button 504, which extends prongs (not shown) for mounting and/or charging switch 500, and/or communicating data to and from switch 500.

FIG. 5B depicts switch 500 with prong extender button 505 instead of button 504. Button 505 is positioned on a front surface of switch 500, and is similar to other extender buttons described above, such as extender button 112 depicted in FIG. 1. Button 505 slides in groove 506 to extend the mounting prongs. For example, in the depicted embodiment, the prongs (not shown) are retracted when button 505 is in an "up" position. As a user slides button 505 down groove 506, the prongs extend.

FIG. 5C depicts an embodiment similar to FIG. 5B, and additionally includes LED charging indicator 507. In the depicted embodiment, at least one of the docking prongs (not shown) is coupled to LED 507. When switch 500 is docked to a dock connected to a power source, the prongs conduct electricity to switch 500. An amount of current is diverted to LED 507, which lights LED 507 and indicates to a user that current is flowing to, and charging, the battery.

Figure 6:
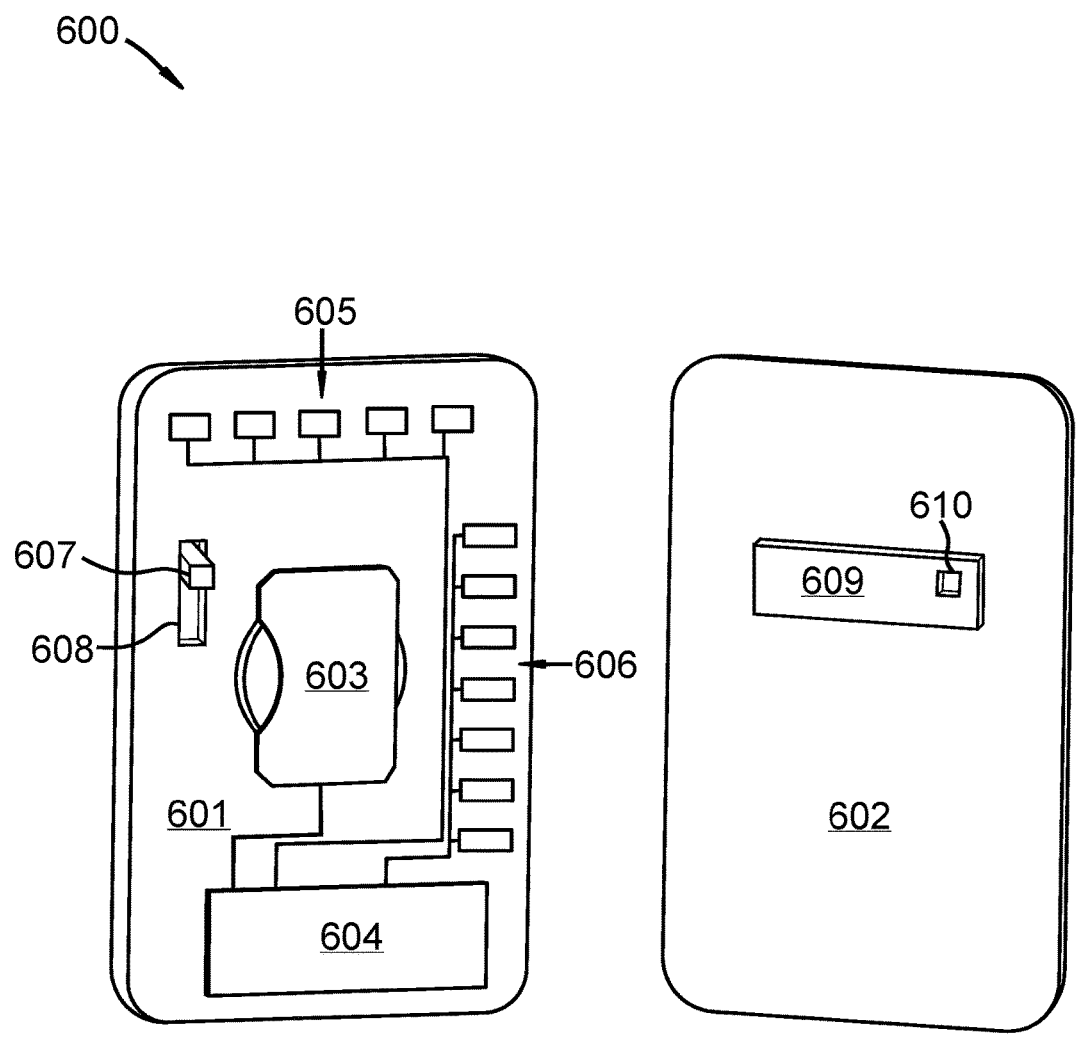
FIG. 6 depicts an embodiment of the inside of a switch, in accordance with the claimed invention.

FIG. 6 depicts an embodiment of the inside of a switch, in accordance with the claimed invention. Switch 600 includes switch inside 601, and switch back cover 602. Switch inside 601 includes battery 603, electronics 604, device type LED indicator lights 605, device status LED indicator lights 606, extender button 607, and groove 608. Switch back cover 602 includes button coupler 609 and button hole 610. Battery 603 is coupled to electronics 604 and provides electronics 604 and LEDs 605, 606 with power. Button 607 slides along groove 608 to extend or retract one or more prongs (not shown, but similar to prong 103 depicted in FIG. 1), which are coupled to coupler 609. Cover 602 fits over a front surface of switch 600 to protect electronics 604 and battery 603. Button 607 fits into hole 610 when cover 602 is placed over switch inside 601 so that coupler 609 couples button 607 to the prongs.

Figure 7A:
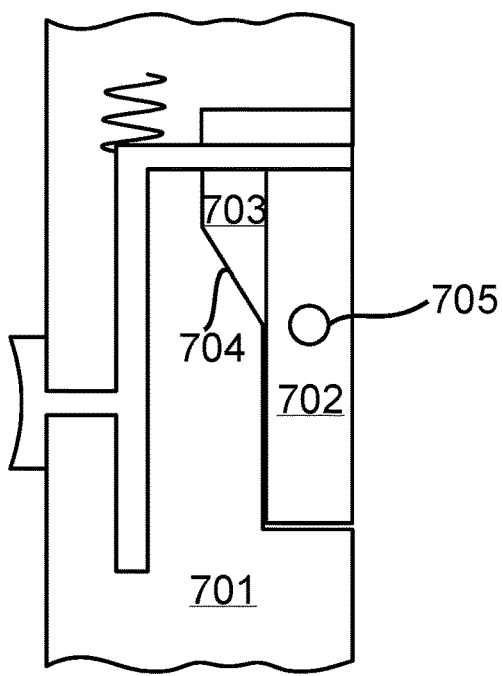
FIGS. 7A-B depict an embodiment of a wireless switch with sloped grooves for containing mounting prongs.
Figure 7B:
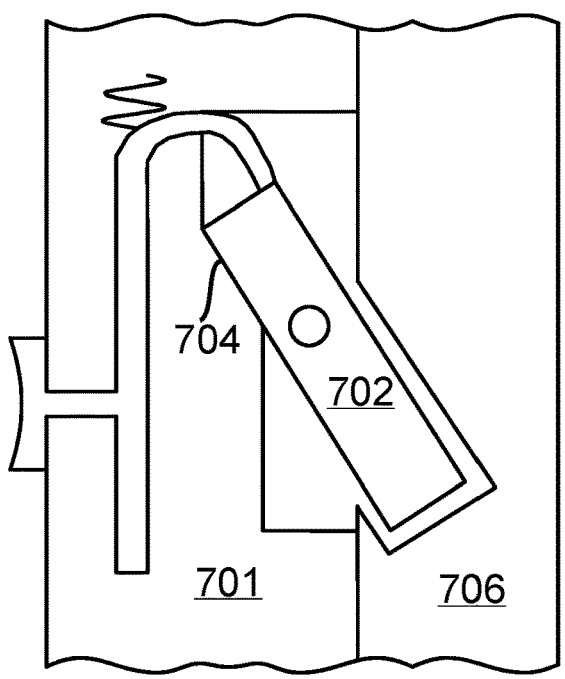

FIGS. 7A-B depict an embodiment of a wireless switch with sloped grooves for containing mounting prongs. As shown in FIG. 7A, switch 701 includes docking prong 702, groove 703 with sloped surface 704, and pivot pin 705. Surface 704 is sloped to allow for flexible positioning of pivot pin 705 in prong 702. When groove 703 does not include sloped surface 704, the position of pivot pin 705 in prong 702 is limited by a depth of groove 703. For example, when groove 703 has a depth matching a depth of pivot pin 702 (such as is depicted above with regard to FIGS. 1-6), pivot pin 705 cannot be positioned further from a top inside corner of prong 702 than ½ the depth of prong 702. Otherwise, the top inside corner of prong 702 will strike a wall of groove 703, preventing prong 702 from extending. One option is to increase groove's 103 depth. However, doing so decreases the stability of prong 702, making it more susceptible to breaking. Including sloped surface 704 captures the best of both embodiments; the positioning of pivot pin 705 is flexible depending on the positioning of sloped surface 704, while maintaining the stability and durability of a narrow groove. FIG. 7B depicts prong 702 extended to mount switch 701 to dock 706. As depicted, prong 702 contacts surface 704 when prong 702 is extended.

As is described in more detail below with regard to FIG. 8, in some embodiments, a switch dock includes a prong similar to prong 702, where the prong is inverted, and the switch includes a prong slot that receives the prong and mounts the switch to the dock. In some such embodiments, the dock includes a groove similar to groove 703 with a sloped surface similar to sloped surface 704, where the sloped surface is inverted, but functions similar to sloped surface 704.

Figure 8:
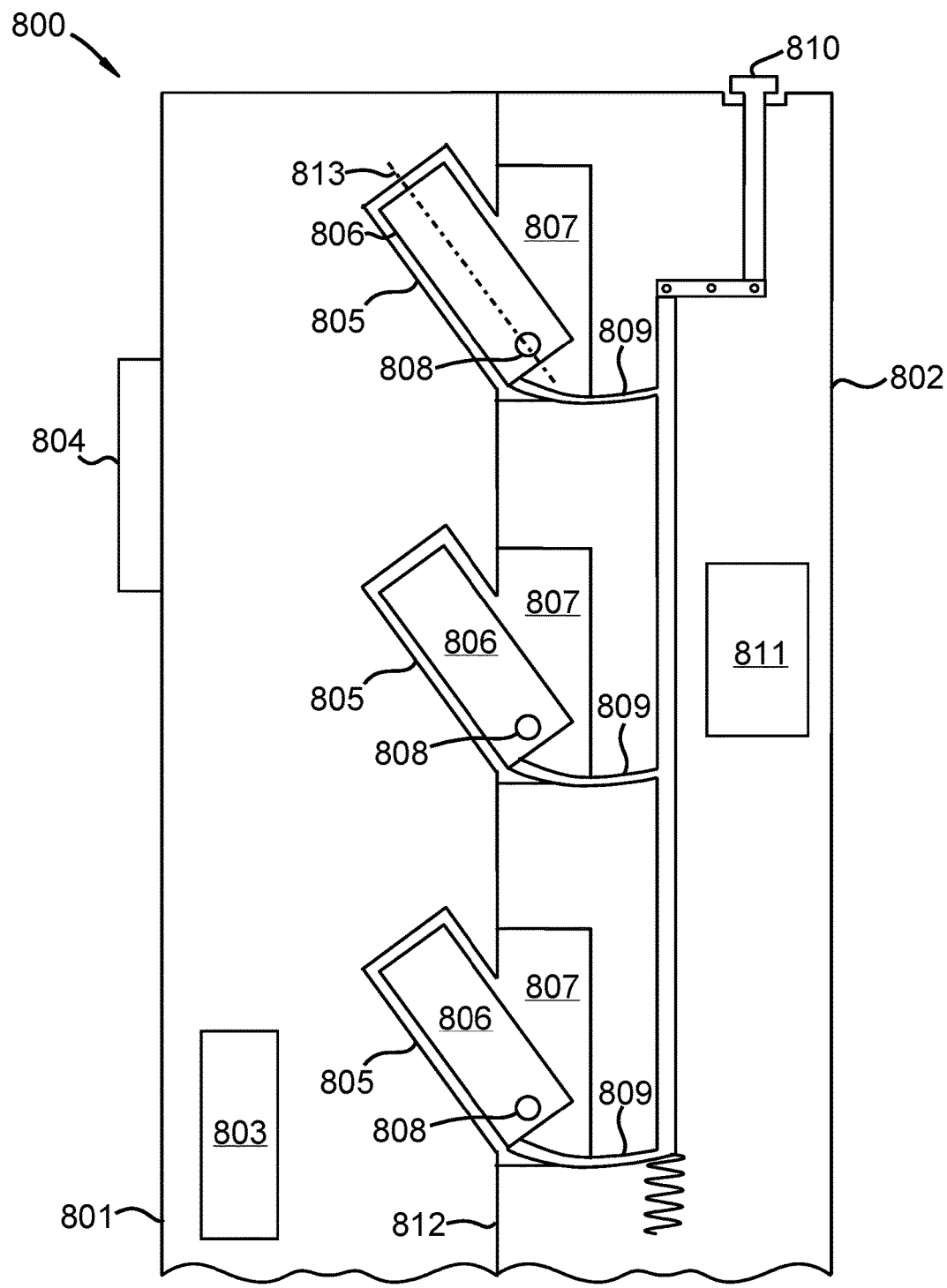
FIG. 8 depicts another embodiment of a battery-powered wireless switch and switch dock.

FIG. 8 depicts another embodiment of a battery-powered wireless switch and switch dock. Apparatus 800 includes wireless switch 801 and switch dock 802. Switch 801 includes switch electronics 803, including a microcontroller and a short range wireless transmitter, tactile control button 804, and angled slots 805 in a back face of switch 801. Dock 802 includes docking prongs 806, grooves 807, pivot pins 808, flexible strips 809, prong extender button 810, and dock electronics 811. Each prong 806 is contained within a groove of dock face 812. Each pivot pin 808 is through one end of prong 808 perpendicular to prong longitudinal axis 813 and parallel to dock face 812. Flexible strips 809 are coupled to the same end of each prong 806 as pivot pins 808. Button 810 is coupled to flexible strips 809 and is used to extend or retract prongs 806. As in other embodiments described above, the number of slots 805 matches the number of prongs 805 and prongs 805 fit into slots 806 to mount switch 801 to dock 802.

Similar to previous embodiments described above, switch 801 forms an electrical connection with dock 802 when switch 801 is mounted to dock 802. For example, in one embodiment, prongs 806 are electrically coupled to hardware memory or hardware processors included in electronics 811 and slots 805 are electrically coupled to the microcontroller included in electronics 803. When switch 801 is mounted to dock 802, switch 801 communicates information with dock 802 via prongs 806. In another embodiment, slots 805 are coupled to the switch battery included in electronics 803 and dock 802 is coupled to a power source. In some embodiments, the power source is a battery included in electronics 811. In other embodiments, the power source is mains electricity. When switch 801 is mounted to dock 802, prongs 806 transfer energy between switch 801 and dock 802 to charge the battery included in electronics 803. In some embodiments, prongs 806 are metallic, and are each coupled to the power source by a metallic contact (not shown, but as depicted in other embodiments). In such embodiments, prongs 806 form electrical contact with the metallic contact when prongs 806 are extended.

In some embodiments, dock 802 also includes an LED charging indicator (not shown, though similar to LED charging indicator 507 depicted in FIG. 5C). At least one prong 806 is further coupled to the LED. When switch 801 is mounted to dock 802, an amount of current is diverted to the LED, which lights the LED and indicates to a user current is flowing to, and charging, the switch battery.

Figure 9A:
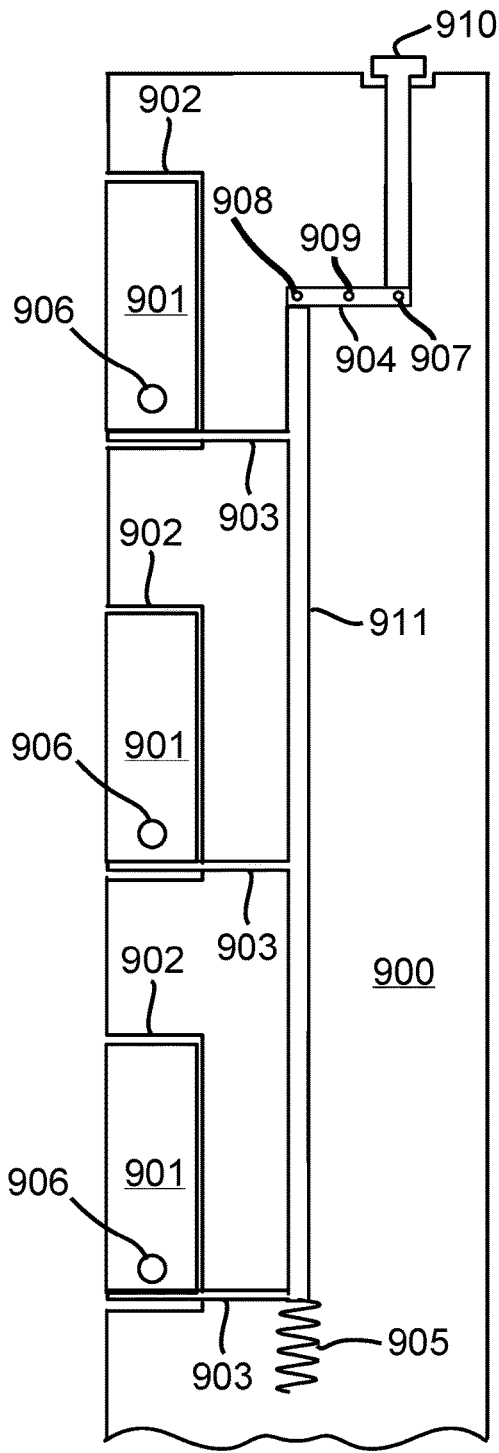
FIGS. 9A-B depict an embodiment of a switch dock with an alternative docking configuration.
Figure 9B:
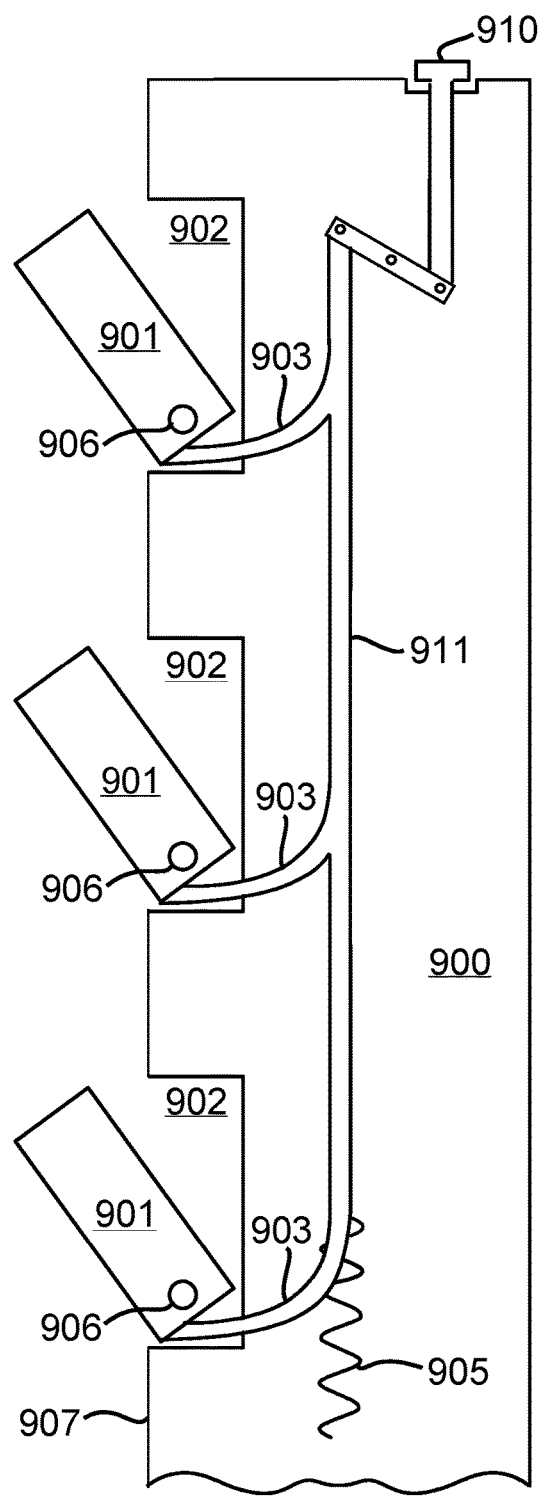

FIGS. 9A-B depict an embodiment of a switch dock with an alternative docking configuration. Dock 900 includes prongs 901, grooves 902, flexible strips 903, coupler bar 904, spring 905, pivot pins 906, coupler pins 907, 908, 909, prong extender button 910, and strip coupler 911. As depicted, pin 907 couples bar 904 to button 910 in a pin joint. Likewise, pin 908 couples bar 904 to coupler 911 in a pin joint. Bar 904 rotates about pin 909 when button 910 is pressed or released. The coupling of button 910 to coupler 911 via bar 904 is such that coupler 911 moves in a direction opposite to that of button 910. Coupler 911 is coupled to flexible strips 903 and spring 905, and flexible strips 903 are coupled to prongs 901. When button 910 is pressed into dock 900, as depicted in FIG. 9B, coupler 911 causes spring 905 to extend and flexible strips 903 to apply a torque to prongs 901 about pins 906 and prongs 901 are extended outside grooves 902. When spring 905 is extended, it applies a force on coupler 911 in a direction opposite to the force applied by a user to press button 910. When the user releases button 910, the force of spring 905 returns button 910 to its original position, such as depicted in FIG. 9A.

Figure 10C:
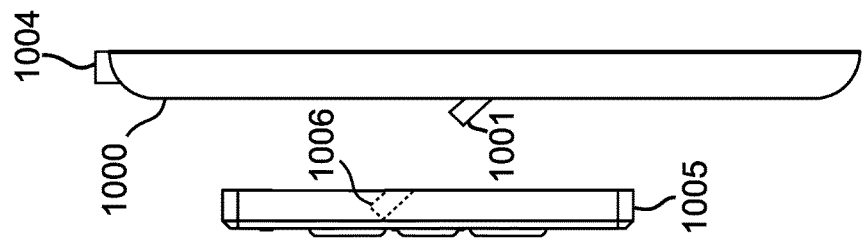
FIGS. 10A-C depict isometric views of embodiments of a wireless switch and switch dock.
Figure 10B:
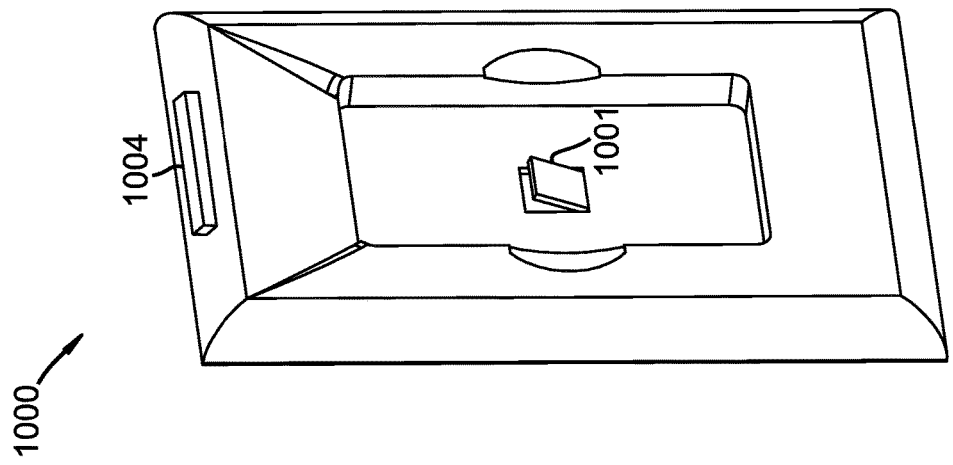
Figure 10A:
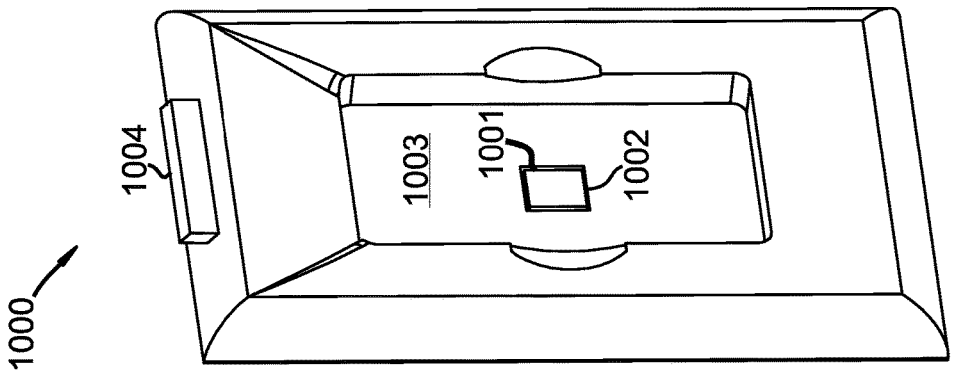

FIGS. 10A-C depict isometric views of embodiments of a wireless switch and switch dock. FIG. 10A depicts dock 1000 which includes prong 1001, groove 1002, dock face 1003, and extender button 1004. As depicted, button 1004 is on a top face of dock 1000. Prong 1001 is retracted and contained within groove 1002 such that an outer surface of prong 1001 is flush with dock face 1003. FIG. 10B depicts an embodiment similar to FIG. 10A, where button 1004 is pressed and prong 1001 is extended. FIG. 10C depicts an embodiment similar to FIG. 10B, additionally including switch 1005. Switch 1005 includes slot 1006. Button 1004 is pressed and prong 1001 is extended. A user mounts switch 1005 to dock 1000 by sliding slot 1006 onto prong 1001.

Figure 11:
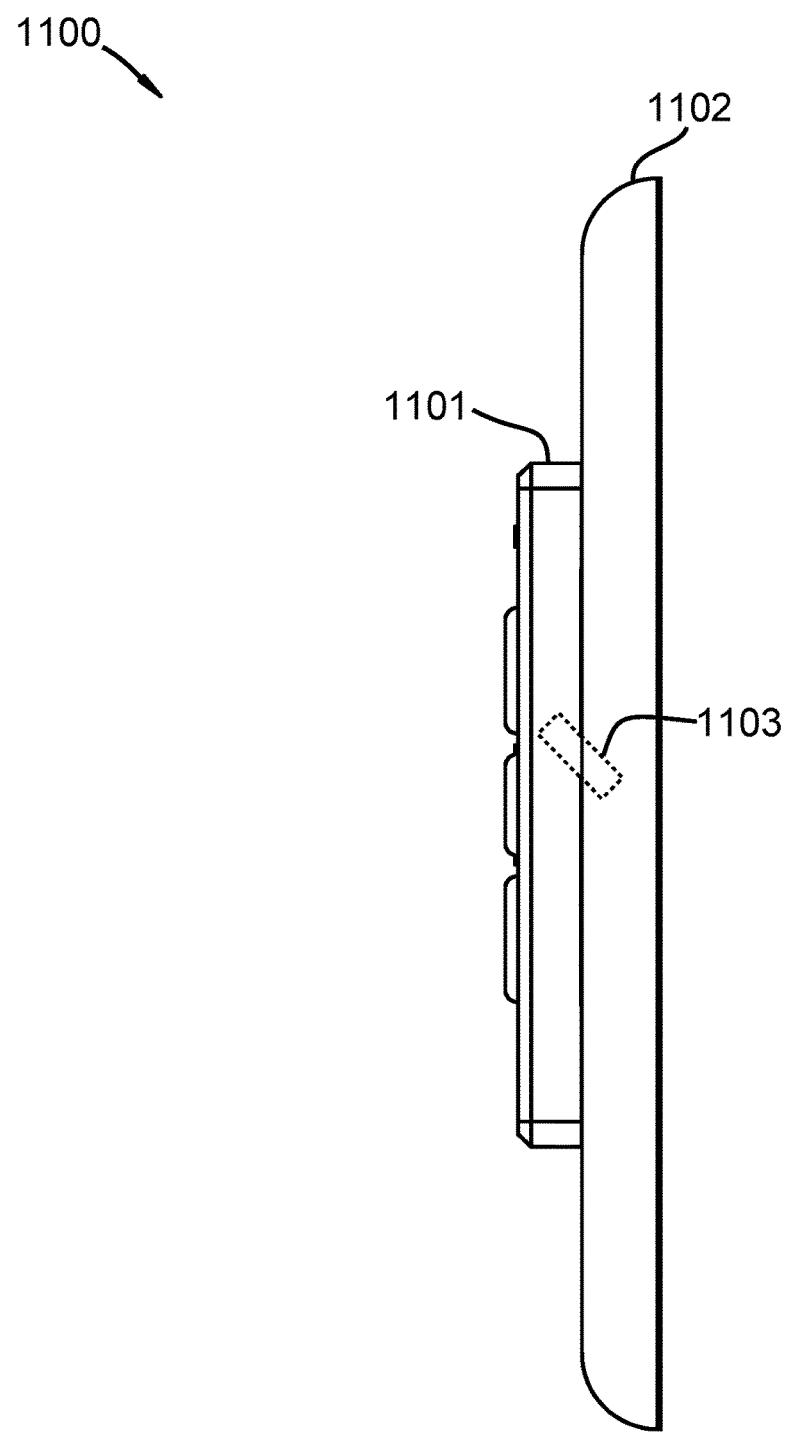
FIG. 11 depicts a side view of an embodiment of a wireless switch mounted to a switch dock.

FIG. 11 depicts a side view of an embodiment of a wireless switch mounted to a switch dock. Apparatus 1100 includes switch 1101 and dock 1102. As depicted, switch 1101 is mounted to dock 1102. A dock-side face of switch 1101 is in contact with a switch-side face of dock 1102. In one embodiment, prong 1103 is included in switch 1101, in which case dock 1102 includes a slot and prong 1103 is slid into the slot. In another embodiment, prong 1103 is included in dock 1102, in which case switch 1101 includes a slot that is slid over prong 1103.

The invention claimed is:

1. An apparatus comprising:
    a battery-powered wireless switch having a microcontroller, a short range wireless transmitter, one or more tactile control buttons, one or more docking prongs, each docking prong contained within a groove in a switch back, pivot pins through one end of each docking prong perpendicular to a prong longitudinal axis and parallel to the switch back, flexible strips coupled to the same end of each docking prong as the pivot pins, and a prong extender button coupled to the flexible strips; and
    a switch dock comprising one or more docking prong slots, wherein the number of slots matches the number of prongs, and wherein the prongs fit in the slots to mount the switch to the dock.

2. The apparatus of claim 1, the dock further comprising hardware memory, one or more hardware processors, and a transceiver.

3. The apparatus of claim 2, wherein the prongs are coupled to the switch microcontroller, wherein the slots are coupled to one or more of the hardware memory or hardware processors, wherein the switch communicates information with the dock via the prongs.

4. The apparatus of claim 1, wherein the prongs are coupled to the switch battery, wherein the dock is coupled to a power source, and wherein the prongs transfer energy between the switch and the dock to charge the battery.

5. The apparatus of claim 4, wherein the prongs are each coupled to the switch battery by a metallic contact, wherein the prong is metallic, and wherein the prong forms electrical contact with the metallic contact when the prong is extended.

6. The apparatus of claim 4, wherein at least one of the prongs is further coupled to an LED, wherein an amount of current is diverted to the LED, which lights the LED and indicates to a user current is flowing to, and charging, the battery.

7. The apparatus of claim 1, wherein the prongs are plastic.

8. The apparatus of claim 1, wherein each groove comprises a sloped surface, and wherein the prong contacts the sloped surface when the prong is extended.

9. The apparatus of claim 1, the switch further comprising two or more device type LED indicator lights and two or more device status LED indicator lights, wherein the device type indicator lights indicate to a user one or more groups of devices selected for control by the switch, and wherein the device status indicator lights indicate to a user a selected-device operation level.

10. The apparatus of claim 9, wherein the two or more device type indicator lights are aligned parallel to a top portion of the switch, and wherein the two or more device status indicator lights are aligned parallel to a side portion of the switch.

11. An apparatus comprising:
    a battery-powered wireless switch having a microcontroller, a short range wireless transmitter, one or more tactile control buttons, and one or more angled slots in a back face of the switch; and
    a switch dock comprising one or more docking prongs, each docking prong contained within a groove in a dock face, pivot pins through one end of each docking prong perpendicular to a prong longitudinal axis and parallel to the dock face, flexible strips coupled to the same end of each docking prong as the pivot pins, and a prong extender button coupled to the flexible strips, wherein the number of slots matches the number of prongs, and wherein the prongs fit in the slots to mount the switch to the dock.

12. The apparatus of claim 11, the dock further comprising hardware memory, one or more hardware processors, and a transceiver.

13. The apparatus of claim 12, wherein the prongs are coupled to one or more of the hardware memory or the hardware processors, and wherein the slots are coupled to the microcontroller, wherein the switch communicates information with the dock via the prongs.

14. The apparatus of claim 11, wherein the slots are coupled to the switch battery, wherein the dock is coupled to a power source, and wherein the prongs transfer energy between the switch and the dock to charge the battery.

15. The apparatus of claim 14, wherein the prongs are each coupled to the power source by a metallic contact, wherein the prong is metallic, and wherein the prong forms electrical contact with the metallic contact when the prong is extended.

16. The apparatus of claim 14, wherein at least one of the prongs is further coupled to an LED, wherein an amount of current is diverted to the LED, which lights the LED and indicates to a user current is flowing to, and charging, the switch battery.

17. The apparatus of claim 11, wherein the prongs are plastic.

18. The apparatus of claim 11, wherein each groove comprises a sloped surface, and wherein the prong contacts the sloped surface when the prong is extended.

19. The apparatus of claim 11, the switch further comprising two or more device type LED indicator lights and two or more device status LED indicator lights, wherein the device type indicator lights indicate to a user one or more groups of devices selected for control by the switch, and wherein the device status indicator lights indicate to a user a selected-device operation level.

20. The apparatus of claim 19, wherein the two or more device type indicator lights are aligned parallel to a top portion of the switch, and wherein the two or more device status indicator lights are aligned parallel to a side portion of the switch.

\* \* \* \* \*